A. D. WARNER.
PROCESS FOR MAKING RUBBER FABRIC.
APPLICATION FILED APR. 16, 1909.
945,352.
Patented Jan. 4, 1910.
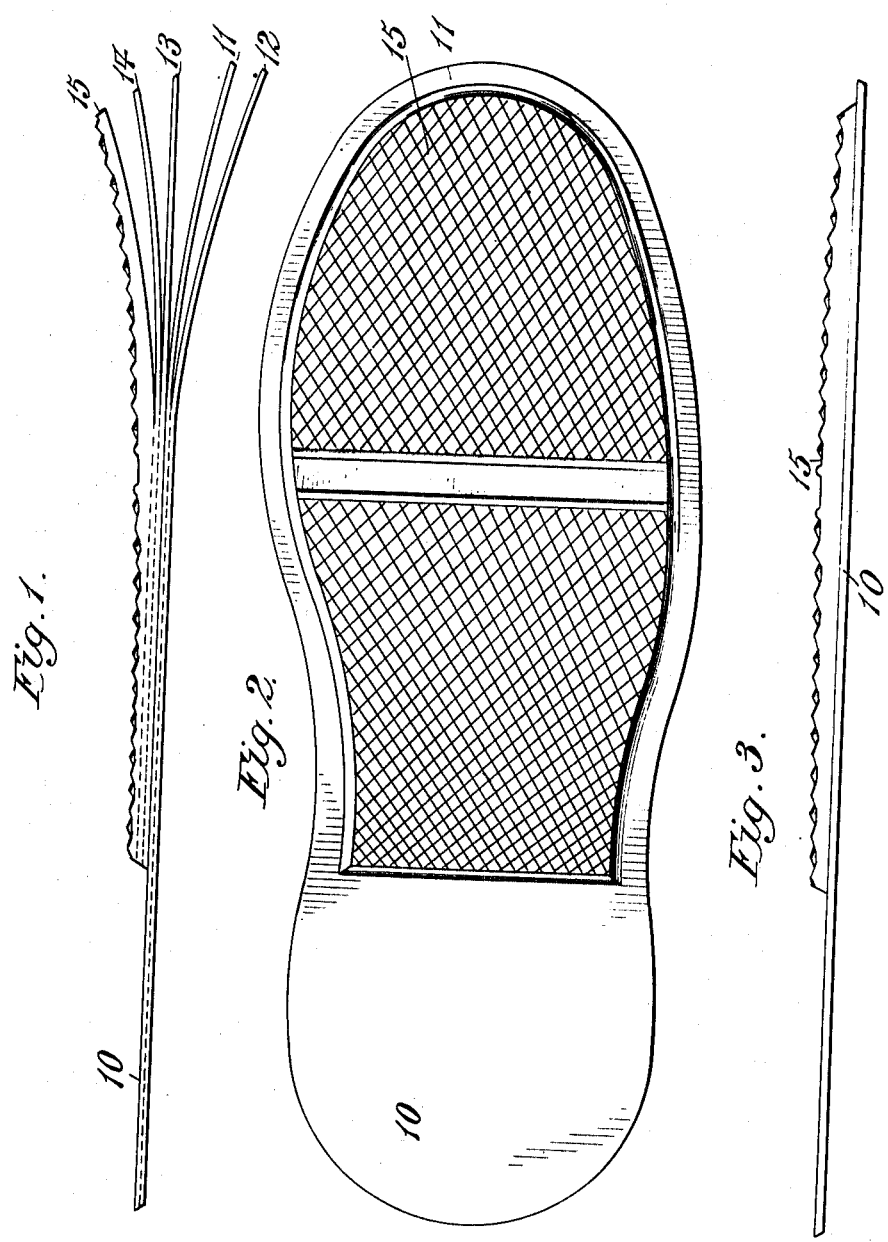

UNITED STATES PATENT OFFICE.

ADNA D. WARNER, OF MISHAWAKA, INDIANA.

PROCESS FOR MAKING RUBBER FABRIC.

945,352.     Specification of Letters Patent.     Patented Jan. 4, 1910.

Application filed April 16, 1909. Serial No. 490,223.

*To all whom it may concern:*

Be it known that I, ADNA D. WARNER, a citizen of the United States, residing in Mishawaka, State of Indiana, have invented certain new and useful Improvement in Processes for Making Rubber Fabric, of which the following is a specification.

The present invention has relation to a process whereby rubber fabric is produced and more particularly to such process as adapted to the production of the parts of shoes or boots.

The invention is especially useful in the production of rubber soles intended to be applied to shoes or boots of any kind and particularly to rubber shoes or boots. The fabric produced by my process is more durable than others made from the same stock and the process does not involve increasing the cost of manufacture or the making of any changes in existing plants or machinery.

The process includes two principal features of improvement which I prefer to combine as hereinafter described, but which may be used independently with good results.

The first of these features, which has reference to the mode of relating what I term the line of rolling of the material in different layers, has for its object the prevention of breaking or checking in the fabric and the utilization of certain peculiarities in the molecular constitution of rubber sheets which I have discovered.

The second feature, having reference to the mode of union of the component sheets, has for its object the entire avoidance of air cells in the completed fabric, and makes it possible (especially in connection with the first named feature) to build up very thick soles without danger of imperfections.

The principal advantages found in soles made acording to this process are—first: superior durability as compared with former soles made of the same thickness and material—second: no increase in the cost of production—third: the soles are made and applied by existing types of machinery and therefore their manufacture involves no change in existing plants—fourth: a thicker sole is produced without impairing the quality of the material—fifth: the various portions of the sole are individually adapted to the special wearing stresses to which they are respectively subjected. These advantages result from the principal features of improvement above alluded to.

It is obviously desirable to make rubber soles on boots and shoes as thick as possible, consistently with comfort in wearing them. The life of such soles is of course roughly proportional to such thickness, other things being equal. But it is found in practice that the thicker a single sheet of rubber is rolled in calendering the greater is the proportion of air cells, and as these cells are opened by process of wear, they absorb dirt and water and cause rapid disintegration of the material. On the other hand, where soles are built up of separate calendered sheets united by cement, the utmost care cannot prevent formation of similar cells, due to the volatile ingredient of the rubber cement (generally benzene) permeating the mass of the rubber and producing a spongy texture by its expansion.

I have discovered that separate calendered sheets of green or uncured rubber may be united perfectly by rolling cold under increased pressure as compared with the calendering pressure, and that, where this process is resorted to, practically all spongy texture is done away with. I have further discovered that by the use of this process the peculiar internal structure of the material originally caused by the calendering rolls is not materially disturbed. This discovery has rendered possible the arrangement of the various sheets or layers as hereinafter described without sacrificing any of the advantages pointed out.

The improved sole in its preferred form, will be described with reference to the accompanying drawings wherein—

Figure 1 is a side elevation of one form of the improved sole showing the laminæ or some of them separated at one end for greater distinctness, Fig. 2 is a plan view of the under or outer face of said sole as completed, and Fig. 3 is a side elevation as completed.

Where rubber compounds are formed into sheets by passing them between hot calendering rolls the internal structure is modified, and I have found that the following qualities are observable. First: the tensile strength is greater in the direction in which the rolling has occurred. This direction I have termed the "line of rolling". Second: the elasticity or resiliency is greater at right angles to this direction. Third: the tendency to split or check is greater when a sheet is bent on curves whose axis is parallel to the line of rolling (in other words across the sheet) than when bent at right angles to this direction. I have also discovered that where calendered sheets of rubber compound are united by cold rolling as above described, this internal structure is not interfered with by the excessive pressure necessary in connection with this process. Furthermore I have found by practical commercial use that, by uniting sheets with their lines of rolling making material angles the one with the other, the advantageous qualities belonging to each direction of the lines may be united as hereinafter more fully set forth.

The particular sole shown as an example in the drawings is built up as follows: The plain sole 10, intended to receive the heel and tap and to be joined to the uppers, is composed of a number of laminæ or sheets 11 and 12. In the particular instance illustrated these are two in number although more may be used if desired without departing from my invention. I prefer to form the tap of a number of intermediate laminæ or sheets 13 and 14, upon which is placed a thicker outside tap sole 15, preferably corrugated, as shown, in a well known manner.

In using a boot or shoe, the act of walking or running subjects the entire sole to repeated bending strains or curves whose axis lies across the shoe or boot. Hitherto, where soles were built up of separate sheets, they have been placed with the lines of rolling of all the sheets across the shoe. The result has been a very general tendency to check or split across the sole. It is obvious that the greater degree of bending will come in the lowermost layer 15 and therefore the arrangement of material should be such as to afford the maximum elasticity at this part of the sole. As I have pointed out above, this is afforded by placing the line of rolling across the sole at right angles, and I therefore prefer to so place the corrugated layer 15. I have discovered, however, that the tendency to check or split which would otherwise exist in a layer so placed, may be overcome by uniting with the layer 15 other layers as 11, 12, 13 and 14, whose lines of rolling are longitudinal with respect to the sole. Broadly speaking this may be accomplished in any suitable manner (including the use of cement) but I prefer the processes described below.

The arrangement described affords the tensile strength and the prevention of checking due to longitudinal lines of rolling, while also giving the elasticity in the under portion of the sole due to transverse lines. Accordingly I have found that shoes and boots provided with rubber soles made as above described exhibit increased wearing qualities without sensible diminution of elasticity. Moreover tearing or splitting through the whole sole is entirely prevented.

It is within the scope of this invention to place the alternate sheets with their lines of rolling crossing each other, or any other arrangement of crossed lines of rolling might be employed without departing from this invention. Where sheets are thus joined with lines of rolling crossed, in order to avoid distortion or change of molecular arrangement, as well as to prevent the formation of air cells within the sole, I prefer to unite the sheets by running them together cold, in uncured condition through laminating rollers of a well known type, having a yielding pressure caused by the use of weights or springs. The weight or pressure used is four or five times as great as that employed where mere cementing is to be accomplished, or where sheets are united hot.

In building up the particular sole illustrated, I take two sheets 11 and 12 and unite them (or a greater number if desired) by the ordinary process of warm rolling with their original rolling lines parallel. From these sheets so united properly shaped pieces indicated by the outermost outline in Fig. 2 are constructed in any well known manner. The sheets 13 and 14 are united in the same manner as 11 and 12 with their original rolling lines parallel, and to this double material is united the outermost corrugated layer or layers 15 with its or their line of rolling at right angles to those of the layers 13 and 14. This last named junction is effected by the cold rolling process above described. From the material produced as last above described properly shaped pieces to form the "taps" are cut out, and these may be joined to the plain sole (composed of the layers 11 and 12) by rolling cold, any grease or other impurity being first removed, preferably by benzene. This completes the sole with the exception of applying the heel, which can be accomplished in any convenient way. The fabric produced as above described is finally vulcanized in any manner appropriate to the particular use for which it is destined.

In my claims the term "rubber" applies to any of the well known compounds to which that term is commercially applied, and capable of treatment as above described, and the word "sole", save when otherwise limited, covers whatever may be joined to the uppers of a boot or shoe beneath the same, whether or not a tap or heel or both be included. In my claims, the expression "united integrally" indicates union of adjacent sheets without the intervention of foreign material such as the benzene or other volatile constituent of rubber cement which causes sponginess and consequent weakening of the fabric.

What I claim is—

1. The process of making rubber fabric which consists in superposing a plurality of sheets of calendered rubber so that the line of rolling of one or more of said sheets makes a material angle with that of another and uniting said sheets integrally, substantially as described.

2. The process of making rubber fabric which consists in superposing two sheets of rubber so that the line of rolling of one crosses that of the other and vulcanizing said sheets together, substantially as described.

3. The process of making rubber fabric which consists in superposing two sheets of calendered rubber so that the line of rolling of one crosses that of the other, rolling the two together in an unvulcanized condition while cold and then uniting the two by vulcanization, substantially as described.

4. The process of making rubber soles for boots or shoes which consists in forming a plain sole by superposing and uniting sheets of rubber with the line of rolling parallel, forming a tap sole by superposing and uniting sheets of rubber the line of rolling of one or more of which makes a material angle with the line of rolling of others, and uniting said tap sole to said plain sole, substantially as described.

5. The process of making rubber soles for boots and shoes which consists in forming a plain sole by rolling together sheets of uncured rubber with the line of rolling parallel, forming a tap sole by rolling together similar sheets placed with the line of rolling of one or more making an angle with the line of rolling of others, uniting said tap sole to said plain sole and vulcanizing the whole, substantially as described.

6. The process of making rubber soles for boots and shoes which consists in rolling a plurality of superposed sheets of uncured rubber with parallel lines of rolling while cold and cutting the resulting composite sheet into proper shape for the plain sole, rolling together other suitably shaped sheets of uncured rubber in a similar manner but with one sheet at least having its line of rolling placed at a material angle to the line of rolling of others, to form the tap sole, uniting said tap sole to said plain sole by cold rolling, and vulcanizing the whole, substantially as described.

7. The process of making rubber soles for boots and shoes which consists in rolling a plurality of superposed sheets of uncured rubber with parallel lines of rolling while cold and cutting the resulting composite sheet into proper shapes for forming the plain sole and the intermediate layer of the tap sole, uniting with said last named layer by cold rolling a suitably shaped outer tap sole having its line of rolling placed at a material angle to that of the other layers, to form a complete tap sole, uniting said complete tap sole to said plain sole by cold rolling, and vulcanizing the whole, substantially as described.

8. The process of making rubber soles for boots and shoes which consists in rolling together a number of uncured sheets of calendered rubber with parallel lines of rolling, cutting therefrom suitably shaped pieces to form the inner portion of the sole with the lines of rolling longitudinal, superposing thereon a suitably shaped tap sole comprising united layers of uncured calendered rubber lying across the sole, uniting said tap sole to the remaining sheets by cold rolling under high pressure, and uniting the whole by vulcanization, substantially as described.

ADNA D. WARNER.

Witnesses:
H. S. MacKaye,
M. A. Butler.